(12) United States Patent
Nakano et al.

(10) Patent No.: US 11,735,336 B2
(45) Date of Patent: Aug. 22, 2023

(54) WIRING MEMBER AND ARRANGEMENT STRUCTURE OF WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Haruka Nakano, Mie (JP); Motohiro Yokoi, Mie (JP); Kenta Ito, Mie (JP); Takuya Kaba, Mie (JP); Suguru Yasuda, Mie (JP); Makoto Higashikozono, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 225 days.

(21) Appl. No.: 17/423,038

(22) PCT Filed: Jan. 31, 2019

(86) PCT No.: PCT/JP2019/003447
§ 371 (c)(1),
(2) Date: Jul. 14, 2021

(87) PCT Pub. No.: WO2020/157929
PCT Pub. Date: Aug. 6, 2020

(65) Prior Publication Data
US 2022/0076862 A1 Mar. 10, 2022

(51) Int. Cl.
*H01B 7/40* (2006.01)
*H01B 7/08* (2006.01)
*H02G 3/30* (2006.01)

(52) U.S. Cl.
CPC ............. *H01B 7/40* (2013.01); *H01B 7/0838* (2013.01)

(58) Field of Classification Search
CPC ........ H02G 3/305; H01B 7/08; H01B 7/0823; H01B 7/0838; H01B 7/0846; H01B 7/04; B60R 16/0215; B60R 16/0207
See application file for complete search history.

(56) References Cited

U.S. PATENT DOCUMENTS 3,911,201 A * 10/1975 Fry ...................... H01B 7/0045
174/72 A
4,065,199 A * 12/1977 Andre ...................... H01B 7/08
174/72 A
(Continued)

FOREIGN PATENT DOCUMENTS

CN 101151684 3/2008
CN 204257244 4/2015
(Continued)

OTHER PUBLICATIONS

China Office Action issued in China Patent Application No. 201980088929.5, dated Jan. 18, 2023, together with English translation thereof.
(Continued)

*Primary Examiner* — Hoa C Nguyen
*Assistant Examiner* — Amol H Patel
(74) *Attorney, Agent, or Firm* — Greenblum & Bernstein, P.L.C.

(57) ABSTRACT

A wiring body includes a wire-like transmission member and a base member to which the wire-like transmission member is fixed. A temporary joint part joins portions where a first part and a second part mutually extending in an opposite side from a bending position in the wiring body overlap with each other in a state where the wiring body is bended in an intermediate portion of the wire-like transmis-
(Continued)

sion member in an extension direction to maintain a bending state of the wiring body. The temporary joint part is formed to be able to resolve a state of joining the first part and the second part by a relative separation movement of the first part and the second part.

5 Claims, 6 Drawing Sheets

(56) References Cited

U.S. PATENT DOCUMENTS

| | | | | |
|---|---|---|---|---|
| 5,006,670 | A * | 4/1991 | Plant | B32B 27/32 |
| | | | | 174/106 SC |
| 10,867,721 | B2 | 12/2020 | Ishida et al. | |
| 2003/0102148 | A1 * | 6/2003 | Ohara | H01B 7/08 |
| | | | | 174/117 F |
| 2006/0157267 | A1 * | 7/2006 | Morijiri | H01B 11/203 |
| | | | | 174/117 F |
| 2009/0314515 | A1 * | 12/2009 | Bevirt | H01B 7/40 |
| | | | | 174/110 R |
| 2020/0070749 | A1 * | 3/2020 | Mizuno | H01B 7/40 |

FOREIGN PATENT DOCUMENTS

| | | |
|---|---|---|
| CN | 107005040 | 8/2017 |
| CN | 109038042 | 12/2018 |
| JP | 2002-33554 | 1/2002 |
| JP | 2006-222059 | 8/2006 |
| JP | 2018-137208 | 8/2018 |
| JP | 2018-190696 | 11/2018 |

OTHER PUBLICATIONS

Tanikado, "Lead Wire", JIPII Journal of Technical Disclosure, No. 94-9311, May 2, 1994, pp. 1, along with an English translation thereof.

International Search Report issued in International Patent Application No. PCT/JP2019/003447, dated Mar. 5, 2019, along with an English translation thereof.

* cited by examiner

WIRING MEMBER AND ARRANGEMENT STRUCTURE OF WIRING MEMBER

TECHNICAL FIELD

The present invention relates to a wiring member.

BACKGROUND ART

Patent Document 1 discloses a wire harness including: a functional exterior member formed into a sheet-like shape; and an electrical wire disposed to overlap with the functional exterior member in at least a part of a region along a longitudinal direction, wherein at least a part of a portion where an insulating covering of the electrical wire and the functional exterior member overlap with each other is welded.

PRIOR ART DOCUMENTS

Patent Documents

Patent Document 1: Japanese Patent Application Laid-Open No. 2018-137208

SUMMARY

Problem to be Solved by the Invention

The wire harness disclosed in Patent Document 1 can have a compact form by bending a functional exterior member formed into a sheet-like shape at a time of packing and transportation. For example, tape winding is considered to maintain a bending form of the wire harness.

However, when the bending form of the wire harness is maintained by the tape winding, it is troublesome to detach a portion of tape winding to develop the wire harness.

Accordingly, an object of the present invention is to provide a technique of maintaining a bending form of a wiring member in which a wiring body is bended while developing the wiring member easily.

Means to Solve the Problem

In order to solve the above problem, a wiring member according to a first aspect includes: a wiring body including a wire-like transmission member and a base member to which the wire-like transmission member is fixed; and a temporary joint part joining portions where a first part and a second part mutually extending in an opposite side from a bending position in the wiring body overlap with each other in a state where the wiring body is bended in an intermediate portion of the wire-like transmission member in an extension direction to maintain a bending state of the wiring body, and formed to be able to resolve a state of joining the first part and the second part by a relative separation movement of the first part and the second part.

A wiring member according to a second aspect is the wiring member according to the first aspect, wherein the temporary joint part includes an adhesive part intervening between the first part and the second part and bonded to the first part and the second part.

And, a wiring member according to the first aspect is the wiring member, wherein the temporary joint part includes a direct fixing part formed of the base member in the first part and the base member in the second part directly fixed to each other.

A wiring member according to a fourth aspect is the wiring member according to the first or second aspect, wherein the temporary joint part is formed to be able to resolve the state of joining the first part and the second part with smaller farce than force of holding the sheet member and the wire-like transmission member.

And, a wiring member according to the first aspect includes a sheet member having a main surface on which the wire-like transmission member is fixed as the base member and a cover for covering the wire-like transmission member from a side opposite to the sheet member, wherein the cover is fixed to the sheet member and is not fixed to the wire-like transmission member, and the temporary joint part joins the cover in at least one of the first part and the second part.

A wiring member according to a sixth aspect is the wiring member according to the first, second or fourth aspect, wherein the temporary joint part is formed to be able to resolve the state of joining the first part and the second part with smaller force than force of holding the sheet member and the cover.

An arrangement structure of a wiring member according to a seventh aspect includes: the wiring member according to the first, second, fourth or sixth aspect; and an arrangement target in which the wiring member is disposed in a state where the state of joining the first part and the second part by the temporary joint part is resolved and the first part and the second part are developed.

Effects of the Invention

According to each aspect, the temporary joint part is formed to be able to resolve the state of joining the first part and the second part by a relative separation movement of the first part and the second part, thus the temporary joint state by the temporary joint part can be resolved by the development operation. Accordingly, the bending form can be maintained in the wiring member in which the wiring body is bended while achieving the development easily.

According to the second aspect, the temporary joint part can be simply formed by the intervening object such as an adhesive agent or a double-sided adhesive tape, for example.

And, according to each aspect, the other member needs not be provided as the temporary joint part.

According to the fourth aspect, debonding of the wire-like transmission member from the sheet member can be suppressed when the temporary joint state by the temporary joint part is resolved.

And, according to each aspect, the temporary joint part joins the cover to which the wire-like transmission member is not fixed, thus debonding of the wire-like transmission member from the sheet member can be suppressed when the temporary joint state by the temporary joint part is resolved.

According to the sixth aspect, debonding of the cover from the sheet member can be suppressed when the temporary joint state by the temporary joint part is resolved.

DESCRIPTION OF EMBODIMENT(S)

Embodiment

Figure 1:
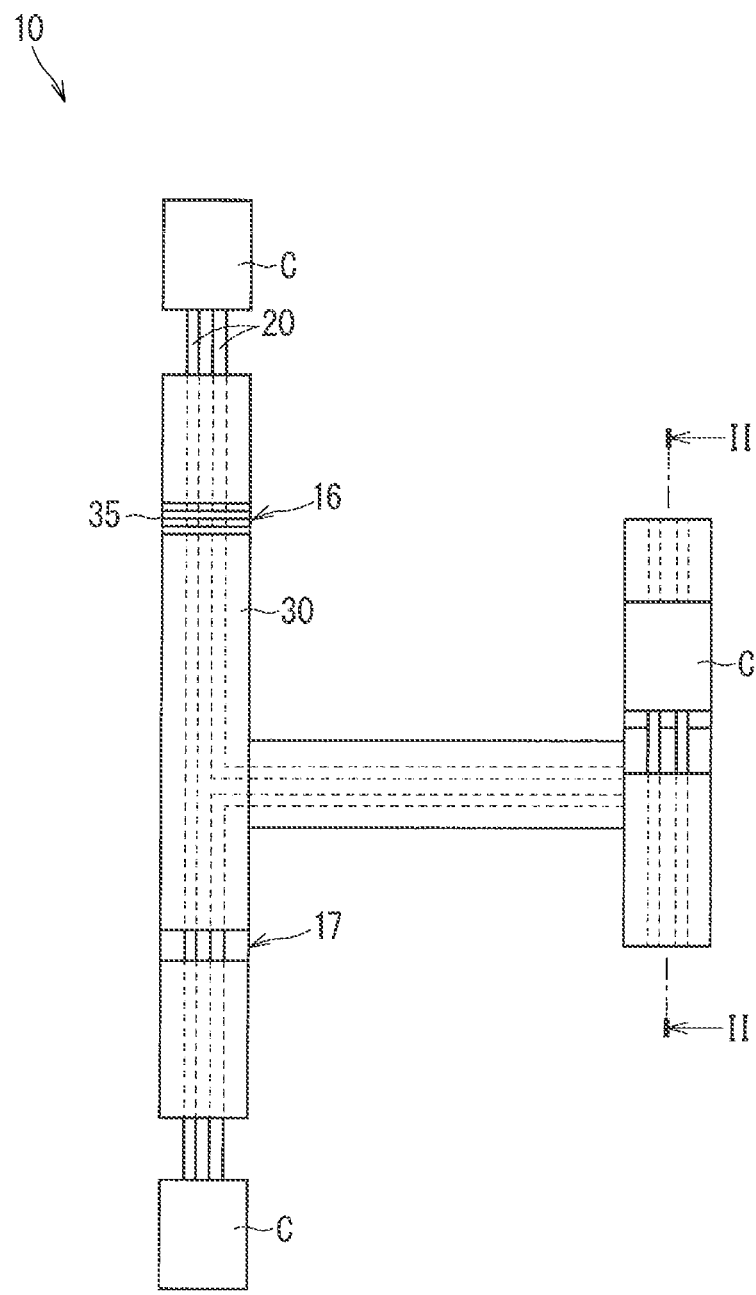
FIG. 1 A plan view illustrating a wiring member according to an embodiment.
Figure 2:
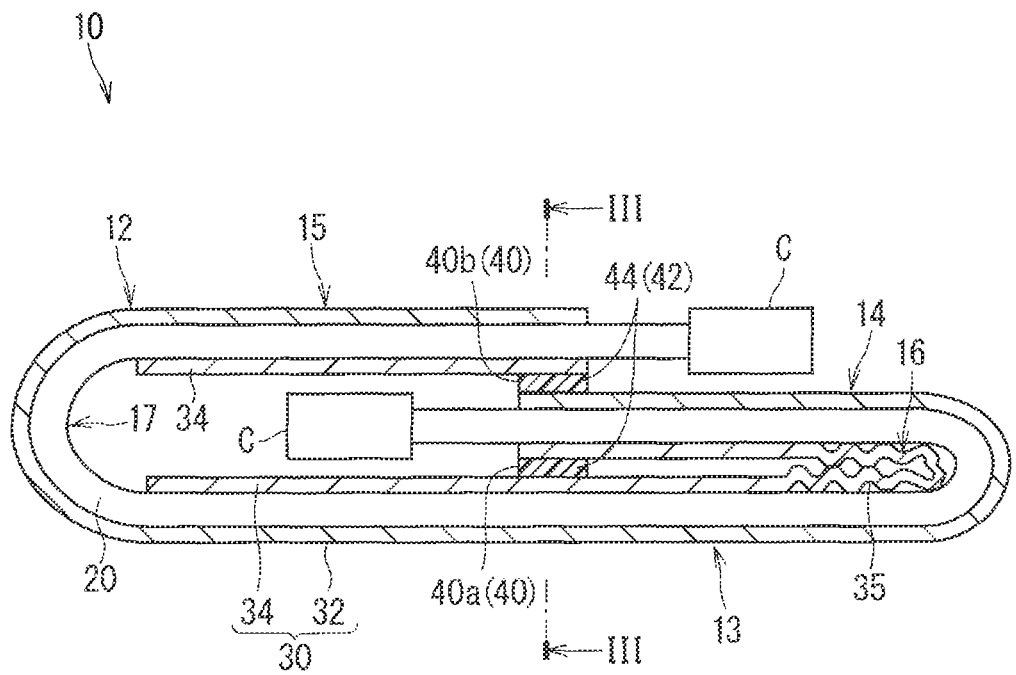
FIG. 2 A schematic cross-sectional view of the wiring member cut along a II-II line in FIG. 1.
Figure 3:
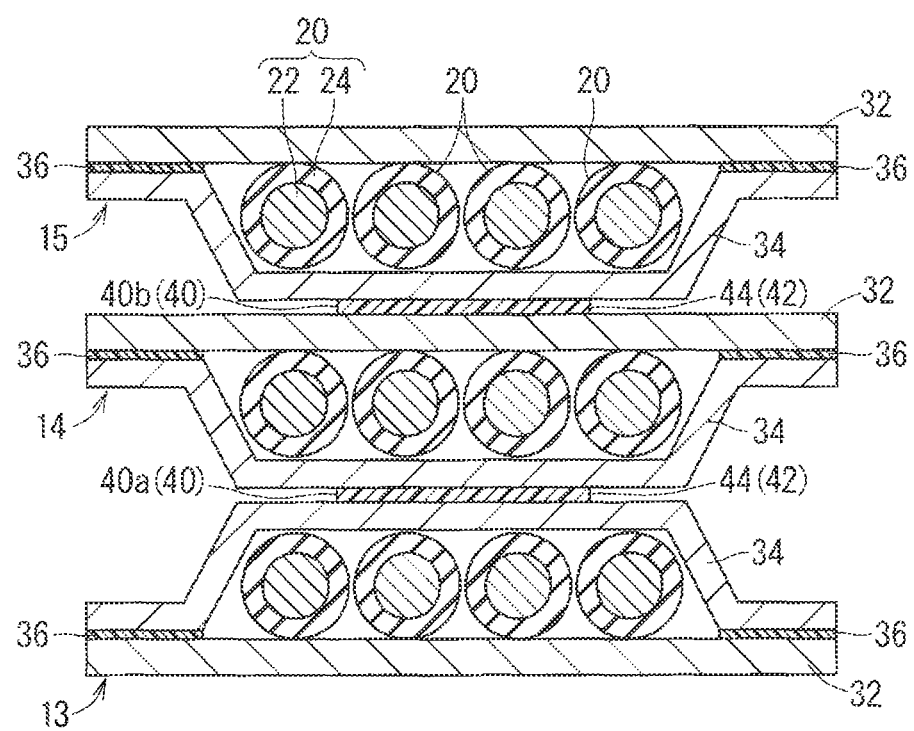
FIG. 3 A schematic cross-sectional view of the wire harness cut along a III-III line in FIG. 2.

A wiring member according to an embodiment is described hereinafter. FIG. 1 is a plan view illustrating a wiring member 10 according to the embodiment. FIG. 2 is a schematic cross-sectional view of the wiring member 10 cut along a II-II line in FIG. 1. FIG. 3 is a schematic cross-sectional view of the wiring member cut along a III-III line in FIG. 2. In the wiring member 10 illustrated in FIG. 1, a left part of a sheet of paper illustrates a state before a wiring body 12 is bended, and a right part of a sheet of paper illustrates a state after the wiring body 12 is bended.

The wiring member 10 includes a wiring body 12 and a temporary joint part 40 maintaining a bending state of the wiring body 12. For example, the wiring member 10 is a packing form of the wiring body 12.

The wiring body 12 is a member mounted to a vehicle to supply electrical power to each apparatus of the vehicle or transmit and receive a signal. The wiring body 12 includes a wire-like transmission member 20 and a base member 30 to which the wire-like transmission member 20 is fixed.

It is sufficient that the wire-like transmission member 20 is a wire-like member transmitting electrical power or light, for example. For example, the wire-like transmission member 20 may be a general wire having a core wire and a covering around the core wire, or may also be a shielded wire, a twisted wire, an enamel wire, a nichrome wire, a bare wire, or an optical fiber.

The wire-like transmission member 20 transmitting the electrical power may be various kinds of signal lines or various kinds of power lines. The wire-like transmission member 20 transmitting the electrical power may be used as an antenna or coil, for example, transmitting or receiving a signal or electrical power to or from a space.

The wire-like transmission member 20 may be a single wire-like object or a composite object of a plurality of wire-like objects (a twisted wire and a cable made up of a plurality of wire-like objects covered by a sheath).

A terminal and a connector C, for example, are appropriately provided in accordance with a connection state of the wire-like transmission member 20 and the other side member in an end portion of the wire-like transmission member 20.

In the example illustrated in FIG. 3, the wire-like transmission member 20 includes a transmission wire body 22 transmitting electrical power or light and a covering 24 covering the transmission wire body 22. When the wire-like transmission member 20 is a general wire, the transmission wire body 22 is a core wire, and the covering 24 is an insulating covering. In the example illustrated in FIG. 3, the plurality of wire-like transmission members 22 having the same diameter and structure are disposed on one sheet member 32, however, the diameter and the structure of each of the plurality of wire-like transmission members 20 may be appropriately set, thus the wire-like transmission members 20 each having a different diameter and a structure, for example, may be disposed on the same sheet member 32.

The base member 30 is a member holding the wire-like transmission member 20 in a state of two-dimensionally positioning the wire-like transmission member 20. Herein, the base member 30 includes the sheet member 32 and a cover 34.

The wire-like transmission member 20 is disposed on one main surface of the sheet member 32. The sheet member 32 keeps the plurality of wire-like transmission members 20 in a state of being arranged side by side. The sheet member 32 may be a member having rigidity with a degree of being able to be curved and hold the plurality of wire-like transmission members 20 in a state of being two-dimensionally positioned, or may be a member having rigidity with a degree of being able to keep itself in a flat state and hold the plurality of wire-like transmission members 20 in a state of being two-dimensionally positioned. The sheet member 32 may have a three-dimensional shaped part such as a part made up of a wall partially standing on the sheet member 32. In the description herein, the sheet member 32 is a member which can be bended.

A material constituting the sheet member 32 is not particularly limited, however, the sheet member 32 is formed of a material containing resin of polyvinyl chloride (PVC), polyethylene terephthalate (PET), or polypropylene (PP), for example. The sheet member 32 may be a fibrous material having fiber such as a non-woven cloth, a woven fabric, or a knitting fabric or a non-fiber material, for example. The non-fiber material may be a sheet material with an inner portion evenly filled or a foam made up by foam molded resin. The sheet member 32 may contain a material such as metal.

The sheet member 32 may be made up of a single layer or a plurality of stacked layers. When the sheet member 32 is made up of the plurality of stacked layers, it is considered that a resin layer and a resin layer are stacked, for example. It is also considered that a resin layer and a metal layer are stacked, for example. The sheet member 32 may be made up of a non-fiber material layer and a non-fiber material layer overlapped with each other, a non-fiber material layer and a fiber material layer overlapped with each other, or a fiber material layer and a fiber material layer overlapped with each other.

The wire-like transmission member 20 is fixed to the sheet member 32. The wire-like transmission member 20 is fixed to the sheet member 32 in a state of being disposed along a predetermined route on a main surface of the sheet member 32. The sheet material 32 is formed into a band-like shape extending along a route of the wire-like transmission member 20. The route of the wire-like transmission member 20 on the sheet member 32 may be appropriately set, thus the wire-like transmission member 20 may also be disposed straight or curved on the sheet member 32. When the wire-like transmission member 20 is curved and disposed on the sheet member 32, the sheet member 32 may also be formed to be curved. The plurality of wire-like transmission members 20 may be branched on the sheet member 32 or disposed to intersect with each other along different routes. In this case, the sheet member 32 may also be branched or intersect.

In the example illustrated in FIG. 1, the plurality of wire-like transmission members 20 are midway branched and disposed to have an H-like shape. The sheet member 32 is formed into an H-like shape along a route of the plurality of wire-like transmission members 20. The sheet member 32 is formed into the shape following the routes of the plurality of wire-like transmission members 20, thus achievable is suppression of interference between the sheet member 32 and the other component and weight saving. Needless to say, it is not necessary that the sheet member 32 is formed into the shape following the routes of the plurality of wire-like transmission members 20, but may also be formed into the other shape such as a quadrangular shape.

The wire-like transmission member 20 and the sheet member 32 are fixed to each other. Applicable as the above fixing state are a contact area fixation and a non-contact area fixation, or both fixations may be used together. Herein, the contact area fixation indicates that a portion where the wire-like transmission member 20 and the sheet member 32 have contact with each other is stuck and fixed. The non-contact area fixation indicates the fixing state which is not the contact area fixation. For example, a sewing thread, the other sheet material, or an adhesive tape presses the wire-like transmission member 20 toward the sheet member 32, or a sewing thread, the other sheet material, or an adhesive tape surrounds the wire-like transmission member 20 and the sheet member 32, thereby holding the wire-like transmission member 20 and the sheet member 32 to keep the wire-like transmission member 20 and the sheet member 32 fixed to each other. In the description hereinafter, the wire-like transmission member 20 and the sheet member 32 are in the state of the contact area fixation. Each description on the contact area fixation is also applicable to the non-contact area fixation as long as each member and material has a configuration to which the non-contact area fixation is not applicable.

Applicable as the configuration of the contact area fixation are an indirect fixation and a direct fixation, or both fixations may also be used together in different regions. Herein, the indirect fixation indicates that the wire-like transmission member 20 and the sheet member 32 are indirectly stuck and fixed via an intervening member such as an adhesive agent, a gluing agent, a double-sided adhesive tape, and a hook and loop fastener provided therebetween. The direct fixation indicates that the wire-like transmission member 20 and the sheet member 32 are directly stuck and fixed without an intervention of the adhesive agent, for example, which is separately provided. Considered in the direct fixation is that resin included in at least one of the wire-like transmission member 20 and the sheet member 32 is melted, thus the wire-like transmission member 20 and the sheet member 32 are stuck and fixed, for example. In the description hereinafter, the wire-like transmission member 20 and the sheet member 32 are in the state of the direct fixation. Each description on the direct fixation is also applicable to the indirect fixation as long as each member and material has a configuration to which the indirect fixation is applicable.

In forming the state of such a direct fixation, the resin is considered to be melted by heat or a solvent, for example. That is to say, the state of the direct fixation may be the state of the direct fixation by the heat or the state of the direct fixation by the solvent. The direct fixation by the heat is preferable.

At this time, a means of forming the state of the direct fixation is not particularly limited, but various means including a known means such as welding, fusion, and melting joint can be used. For example, when the state of the direct fixation by the heat is formed by welding, various welding means such as ultrasonic welding, heating-pressurizing welding, hot air welding, and high frequency welding can be adopted. When the state of the direct fixation is formed by these means, the wire-like transmission member 20 and the sheet member 32 are in the state of the direct fixation by these means. Specifically, when the state of the direct fixation is formed by the ultrasonic welding, for example, the wire-like transmission member 20 and the sheet member 32 are in the state of the direct fixation by the ultrasonic welding. A portion where the state of the direct fixation by the heat is formed by the welding (a fixing portion between the wire-like transmission member 20 and the sheet member 32) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the case of the direct fixation, only the resin included in the covering 24 of the wire-like transmission member 20 may be melted, or only the resin included in the sheet member 32 may be melted. In these cases, the resin which has been melted is stuck on an outer surface of the resin on the other side, and a relatively clear interface may be formed in some cases. In the case of the direct fixation, both the resin included in the covering 24 of the wire-like transmission member 20 and the resin included in the sheet member 32 may be melted. In this case, there may be a case where both the resins are mixed and a clear interface is not formed. Particularly, when the covering 24 of the wire-like transmission member 20 and the sheet member 32 include compatible resin such as the same resin material, for example, there may be a case where both the resins are mixed and a clear interface is not be formed.

The cover 34 is fixed to the sheet member 32. The cover 34 covers the wire-like transmission member 20 from a side opposite to the sheet member 32. The cover 34 is not fixed to the wire-like transmission member 20, but may also be fixed thereto.

Indicated as a fixing state of fixing the sheet member 32 and the cover 34 is the indirect fixation using an intervening object 36 such as an adhesive agent in the example illustrated in FIG. 3. It is obvious that the fixing state of fixing the sheet member 32 and the cover 34 is not limited to the indirect fixation, however, various types of fixing state described in the fixing state of fixing the sheet member 32 and the wire-like transmission member 20 can be used.

The same sheet-like member may be used for the sheet member 32 and the cover 34, or different sheet-like members may also be used. Herein, different sheet-like members are used for the sheet member 32 and the cover 34. Herein, the sheet-like member used for the sheet member 32 is more appropriate to the fixation to the wire-like transmission member 20 than the sheet-like member used for the cover 34. The sheet-like member used for the cover 34 has higher rigidity than the sheet-like member used for the sheet member 32 and is excellent in shape retentivity. For example, the sheet member 32 is a member including a first layer which is formed into a solid sheet-like shape by the same material as the cover 24 of the wire-like transmission member 20 and an electrical wire is fixed to and a second layer which is formed by a non-woven cloth and overlapping with the first layer, and the cover 34 is a member formed into a solid sheet-like shape by nylon, for example.

The cover 34 is formed to have rigidity to be hardly bended, for example. In this case, it is sufficient that the wiring member 10 is provided with an easy-bending part enabling an easy bending. In the example illustrated in FIG. 2, two easy-bending parts 16 and 17 are provided as the easy-bending parts. The easy-bending part 16 is a part in which an accordion structure part 35 having peaks and troughs located alternately is provided in the cover 34. The easy-bending part 17 is a part where the cover 34 is not partially provided. Particularly herein, the easy-bending part 17 is a part where the cover 34 is provided at intervals. The wiring body 12 is bended at portions of the easy-bending parts 16 and 17.

The temporary joint part 40 maintains the bending state of the wiring body 12 in a state where wiring body 12 is bended in an intermediate portion of the wire-like transmission member 20 in an extension direction. The temporary joint part 40 joins portions where a first part and a second part mutually extending in an opposite side from the bending position in the wiring body 12 overlap with each other to maintain the bending state of the wiring body 12.

The temporary joint part 40 is formed to be able to resolve the state of joining the first part and the second part by a relative separation movement of the first part and the second part. At this time, a direction of the relative separation movement of the first part and the second part is not particularly limited. For example, a movement in a direction in which the first part and the second part overlap with each other (an up-down direction in a sheet of paper in FIG. 2) or a movement in a direction perpendicular thereto (a right-left direction in a sheet of paper in FIG. 2 or a normal direction in a sheet of paper in FIG. 2) may also be applicable.

It is sufficient that the temporary joint part 40 can temporarily join the first part and the second part, and the configuration thereof is not particularly limited. For example, in the example illustrated in FIG. 2 and FIG. 3, an adhesive part 42 is provided as the temporary joint part 40. The adhesive part 42 can be deemed as an example of an indirect fixing part.

The adhesive part 42 includes an intervening object 44 intervening between the first part and the second part and bonded to the first part and the second part. The intervening object 44 may be a gluing agent or an adhesive agent other than the gluing agent. A hot-melt adhesive agent, a thermoset adhesive agent, a moisture-curable adhesive agent, and a two-liquid curable adhesive agent, for example, can be used as the adhesive agent other than the gluing agent. When the adhesive agent other than the gluing agent is used, the first part and the second part cannot be bonded again when they are debonded and remain as they are.

An indirect fixing part other than the adhesive part 42 may be provided as the temporary joint part 40. For example, a hook and loop faster may be provided as the indirect fixing part other than the adhesive part 42.

Figure 4:
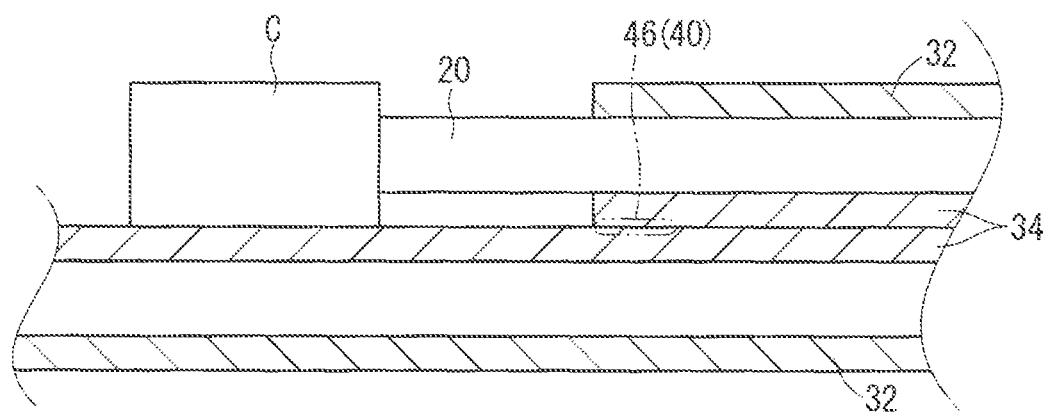
FIG. 4 A schematic cross-sectional view illustrating a modification example of a temporary joint part.

FIG. 4 is a schematic cross-sectional view illustrating a modification example of the temporary joint part 40. In the example illustrated in FIG. 4, a direct fixing part 46 is provided as the temporary joint part 40.

The direct fixing part 46 is formed of a base member 30 in the first part and a base member 30 in the second part directly fixed to each other. Particularly, in the example illustrated in FIG. 4, the direct fixing part 46 is formed of the cover 34 in the first part and the cover 34 in the second part directly fixed to each other. The direct fixation herein is similar to that described in the fixing state of the sheet member 32 and the wire-like transmission member 20.

In the example illustrated in FIG. 2, temporary joint parts 40a and 40b maintain a state where the wiring body 12 is bended into three parts overlapping each other. Specifically, in the wiring member 10, the wiring body 12 includes a base part 13, a first bending part 14, and a second bending part 15. The first bending part 14 is a part extending from one end portion of the base part 13 and bended to overlap with the base part 13. The second bending part 15 is a part extending from the other end portion of the base part 13 and bended to overlap with the first bending part 14. Then, the temporary joint part 40a joins the base part 14 and the first bending part 14. The temporary joint part 40b joins the first bending part 14 and the second bending part 15. Accordingly, in the portion regarding the temporary joint part 40a, the base part 13 and the first bending part 14 function as the first part and the second part, respectively. In the portion regarding the temporary joint part 40b, the first bending part 14 and the second bending part 15 function as the first part and the second part, respectively.

It is obvious that the configuration of the wiring member 10 including the portion where the wiring body 12 is bended into the three parts overlapping each other is not necessary. The wiring member may include a portion where the wiring body 12 is bended into two parts overlapping with each other or may also include a portion where the wiring body 12 is bended into four or more part overlapping with each other. The wiring member may include only a portion where the wiring body 12 is bended into two parts overlapping with each other.

In the case where the base member 30 includes the sheet member 32 and the cover 34, the temporary joint part 40 may join the sheet members 32 to each other, the covers 34 to each other, or the sheet member 32 and the cover 34. In the example illustrated in FIG. 2, the temporary joint part 40a joins the covers 34 to each other. The temporary joint part 40b joins the sheet member 32 and the cover 34.

When the plurality of the temporary joint parts 40 are provided, the plurality of temporary joint parts 40 may have the same temporary joint state or different temporary joint states. For example, in the example illustrated in FIG. 2, both the temporary joint parts 40a and 40b are the adhesive parts 42, however, one of them may be the direct fixing part 46, for example.

When the plurality of the temporary joint parts 40 have the same temporary joint state, materials constituting the plurality of temporary joint parts 40 may be the same or different from each other. Herein, in the example illustrated in FIG. 2, a combination of the members joined by the temporary joint part 40a and a combination of the members joined by the temporary joint part 40b are different from each other. In this case, the temporary joint parts 40a and 40b may be made up of the same material or different materials so as to correspond with the combination of each material.

It is sufficient that the temporary joint part 40 is formed to be able to resolve the state of joining the first part and the second part with smaller force than force of holding the sheet member 32 and the wire-like transmission member 20. Accordingly, debonding of the sheet member 32 and the wire-like transmission member 20 can be suppressed when the temporary joint state by the temporary joint part 40 is resolved. Particularly, it is sufficient that the temporary joint part 40b temporarily joining the sheet member 32 is formed to be able to resolve the state of joining the first part and the second part with smaller force than force of holding the sheet member 32 and the wire-like transmission member 20.

The temporary joint part 40 joins the cover 34 in at least one of the first part and the second part. With regard to the temporary joint part 40a, the temporary joint part 40 joins the cover 34 in both the base part 13 and the first bending part 14, that is to say, in both the first part and the second part. With regard to the temporary joint part 40b, the temporary joint part 40 joins the cover 34 in the second bending part 15, that is to say, in one of the first part and the second part. When the temporary joint part 40 joins the cover 34 in this manner, it is sufficient that the temporary joint part 40 is formed to be able to resolve the joint state of the first part and the second part with smaller force than force of holding the sheet member 32 and the cover 34. Accordingly, debonding of the sheet member 32 and the cover 34 can be suppressed when the temporary joint state by the temporary joint part 40 is resolved.

In the case of the adhesive part 42, the intervening object 44 having small adhesive force is used, for example, thus the holding force of the temporary joint part 40 can be reduced. In the case of the direct fixing part 46, energy supplied at the time of forming the direct fixing part 46 is reduced, thus the holding force of the temporary joint part 40 can be reduced. More specifically, in the case of the direct fixing part 46 by the ultrasonic welding, the energy supplied at the time of forming the direct fixing part 46 can be reduced by reducing an amplitude of vibration, welding pressure, and a welding time.

In the case of the direct fixing part 46, even when the energy supplied at the time of forming the direct fixing part 46 is the same, for example, the holding force may be changed depending on the combination of the material. When the energy supplied at the time of forming the direct fixing part 46 is the same, the holding force between different types of material tends to be smaller than the holding force between the same type of material. It is also applicable that the direct fixing part 46 is adopted in the temporary joint part 40b joining the sheet member 32 and the cover 34 and the adhesive part 42 is adopted in the temporary joint part 40a joining the covers 34 to each other.

<Development Operation>

Figure 5:
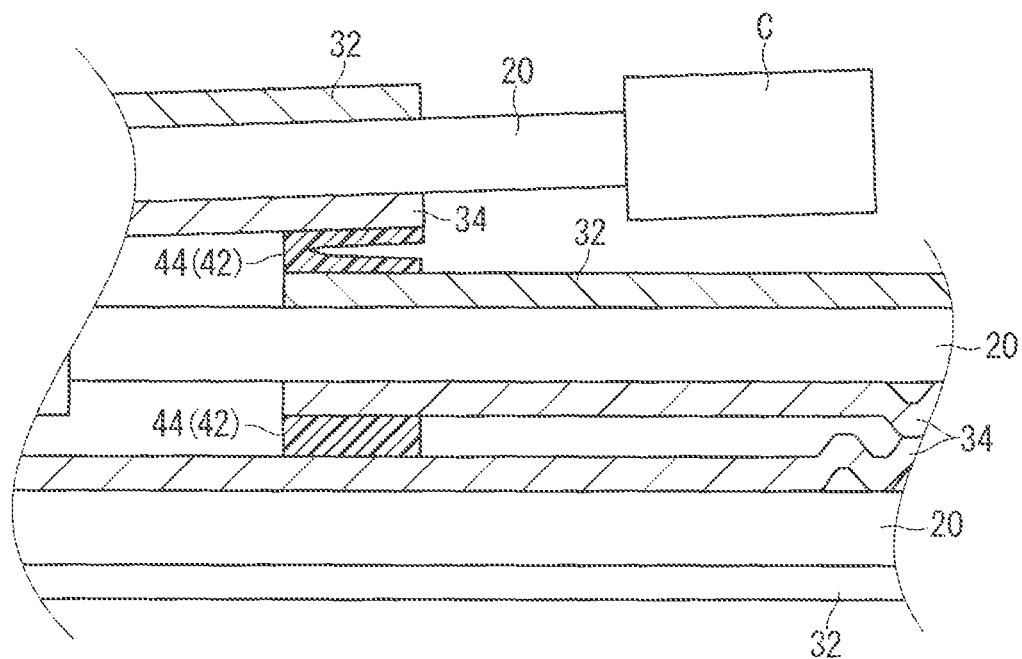
FIG. 5 An explanation diagram illustrating a state where the wiring member having an adhesive part is developed.

FIG. 5 is an explanation diagram illustrating a state where the wiring member 10 having the adhesive part 42 is developed. In an example illustrated in FIG. 5, the first part and the second part perform a separation movement in different directions, and the wiring member 10 is developed. The same applies to an example illustrated in FIG. 6 described hereinafter.

In the case where the wiring member 10 having the adhesive part 42 is developed, when the temporary joint state by the adhesive part 42 is resolved, a trace thereof is considered to enter one of the conditions as follows or a condition of a combination of the plurality of conditions. A first condition is a condition that an interface between the first part or the second part and the adhesive part 42 are debonded. A second condition is a condition that one of the first part and the second part partially or wholly adheres to the other one of the first part and the second part. Typical examples of the second condition include a condition that an interlayer separation occurs between a portion of an inner portion of one of the first part and the second part constituting the interface with the adhesive part 42 and a surrounding portion thereof, and a part of the interlayer separation in the first part or the second part adheres to the other one of the first part and the second part. A third condition is a condition that an interlayer separation occurs between a portion on a side of the first part and a portion on a side of the second part in an inner portion of the adhesive part 42. The example in FIG. 5 illustrates the third condition.

In the case of the adhesive part 42 by the intervening object 44 having re-adhesion properties at a time of clear debonding at an interface with the other side member, such as a gluing agent, when the wiring member 10 having the adhesive part 42 is developed and enters the first condition, the adhesive part 42 can have the re-adhesion properties. In the case of the adhesive part 42 by the gluing agent, a portion where the wiring member 10 having the adhesive part 42 is developed and enters the second or third condition does not have the re-adhesion properties or has reduced adhesion properties. For example, a portion where the other side member does not adhere to a bonding surface of the adhesive part 42 by the gluing agent but enters the first condition can enter a condition having re-adhesion properties. However, when a dust or dirt on a surface of the other side member adheres to the bonding surface of the adhesive part 42 by the gluing agent, the portion does not have the re-adhesion properties or has reduced adhesion properties. For example, a portion where an interface between a fibrous material and the adhesive part 42 by the gluing agent is debonded and the fibrous material adheres to the bonding surface of the adhesive part 42 by the gluing agent enters the second condition, and does not have the re-adhesion properties or has reduced adhesion properties.

In the case of the adhesive part 42 by the intervening object 44 which does not have re-adhesion properties as long as it is not processed, such as a hot-melt adhesive agent, or the adhesive part 42 by the intervening object 44 which does not have re-adhesion properties even when it is processed, such as a thermoset adhesive agent, even when the wiring member 10 having the adhesive part 42 is developed and enters any of the first to third conditions, the trace of the adhesive part 42 does not have re-adhesion properties at least when it remains as it is.

Figure 6:
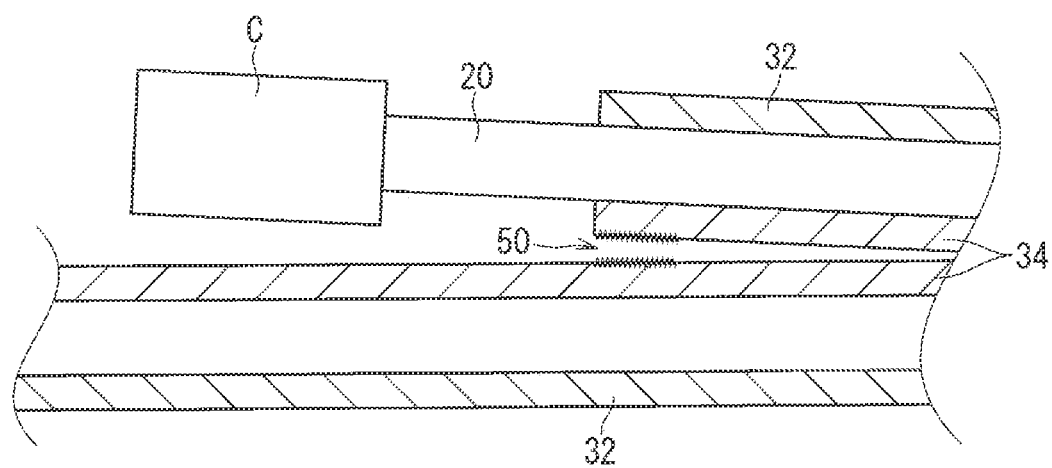
FIG. 6 An explanation diagram illustrating a state where the wiring member having a direct fixing part is developed.

FIG. 6 is an explanation diagram illustrating a state where the wiring member 10 having the direct fixing part 46 is developed.

In the case where the wiring member 10 having the direct fixing part 46 is developed, when the temporary joint state by the direct fixing part 46 is resolved, a trace 50 thereof is considered to enter one of the first and second conditions describe above. That is to say, the first condition is a condition where the interface of the first part and the second part in the direct fixing part 46 is debonded. The first condition may occur when resin of only one of the different types of material is melted and the direct fixing part 46 is formed. The second condition is a condition that one of the first part and the second part is partially or wholly attached to the other one of the first part and the second part. The second condition may occur when resin of both the different types of material is melted and the direct fixing part 46 is formed. Typical examples of the second condition include a condition that an interlayer separation occurs between a portion of an inner portion of one of the first part and the second part including the interface of the direct fixing part 46 and a surrounding portion thereof, and a part of the interlayer separation is attached to the other one of the first part and the second part. The example in FIG. 6 illustrates the second condition.

In the case where the wiring member 10 having the direct fixing part 46 is developed, even when the wiring member 10 enters any of the first to third conditions, the trace 50 of the direct fixing part 46 does not have re-adhesion properties at least when it remains as it is.

Preferable as the temporary joint part 40 is that the trace of the temporary joint part 40 does not have re-adhesion properties when it remains as it is once the temporary joint state of the first part and the second part is resolved.

<Arrangement Structure 100 of Wiring Member>

Figure 7:
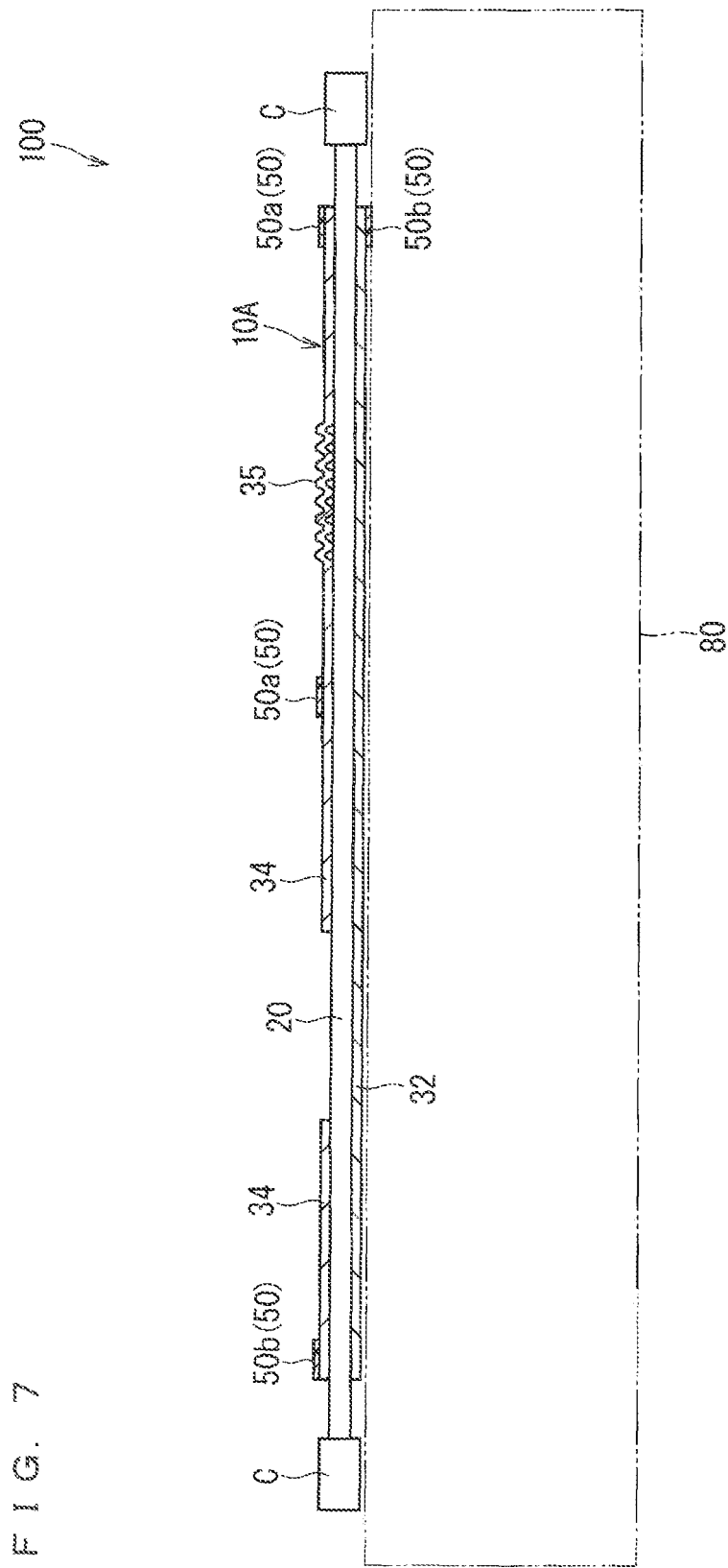
FIG. 7 A schematic cross-sectional view illustrating an arrangement structure of the wiring member according to the embodiment.

FIG. 7 is a schematic cross-sectional view illustrating an arrangement structure 100 of a wiring member according to an embodiment.

The wiring member 10 described above is developed and disposed on an arrangement target 80 to constitute the arrangement structure 100 of the wiring member.

The arrangement target 80 is not particularly limited. The arrangement target 80 is each member of a vehicle such as a roof, a floor, an instrument panel, a reinforcement in a vehicle, for example.

In the description hereinafter, when the wiring member 10 before development needs to be distinguished from that after development, the wiring member 10 after development is referred to the wiring member 10A. In the wiring member 10A, a state where the temporary joint part 40 joins the first part and the second part is resolved, and the first part and the second part are developed. When the wiring member 10 is developed and the temporary joint part 40 is resolved, the trace 50 of the temporary joint part 40 is left in the wiring member 10A after development. In the arrangement structure 100 of the wiring member, the trace 50 of the temporary joint part 40 is not used for the fixation to the arrangement target 80.

It is sufficient that a rejoining cannot be achieved as long as the trace 50 of the temporary joint part 40 is not processed and remains as it is in the arrangement structure 100 of the wiring member. Accordingly, it can be suppressed that the trace 50 of the temporary joint part 40 adheres to a surrounding member after development and interferes an arrangement operation of the wiring member 10. For example, once the temporary joint state of the first part and the second part is resolved, adopted is the temporary joint part 40 which does not have re-adhesion properties when it remains as it is. When the wiring member 10 having this temporary joint part 40 is developed, rejoining cannot be achieved as long as the trace 50 of the temporary joint part 40 is not processed and remains as it is.

In the wiring member 10, the wiring body 12 is bended so that the bending parts 14 and 15 overlap with each other on a surface of the base part 13 on a side opposite to a surface facing a side of the arrangement target 80. In the arrangement structure 100 of the wiring member, a trace 50a of the temporary joint part 40a is not located on the side of the arrangement target 80. The temporary joint part 40b joins the first bending part 14 and the second bending part 15. At this time, when the trace 50b of the temporary joint part 40b is left in the first bending part 14, the trace 50b of the temporary joint part 40b is located on the side of the arrangement target 80, however, when the trace 50b of the temporary joint part 40b is not left in the first bending part 14, the trace 50b of the temporary joint part 40b is not located on the side of the arrangement target 80. When the trace 50 of the temporary joint part 40 is not located on the side of the arrangement target 80 after development, it can be suppressed that the trace 50 of the temporary joint part 40 adheres to an unintended position in the arrangement target 80 and interferes an arrangement operation of the wiring member 10.

According to the wiring member 10 having the above configuration, the temporary joint part 40 is formed to be able to resolve the state of joining the first part and the second part by a relative separation movement of the first part and the second part, thus the temporary joint state by the temporary joint part 40 can be resolved by the development operation. Accordingly, the bending form can be maintained in the wiring member 10 while achieving the development easily.

When the temporary joint part 40 includes the adhesive part 42, the temporary joint part 40 can be simply formed by the intervening object 44 such as an adhesive agent or a double-sided adhesive tape, for example. When the temporary joint part 40 includes the direct fixing part 46, the other member needs not be provided as the temporary joint part 40.

The temporary joint part 40 is formed to be able to resolve the state of joining the first part and the second part with smaller force than force of holding the sheet member 32 and the wire-like transmission member 20, thus debonding of the wire-like transmission member 20 from the sheet member 32 can be suppressed when the temporary joint state by the temporary joint part 40 is resolved.

The temporary joint part 40 joins the cover 34 to which the wire-like transmission member 20 is not fixed. Accordingly, debonding of the wire-like transmission member 20 from the sheet member 32 can be suppressed when the temporary joint state by the temporary joint part 40 is resolved.

The temporary joint part 40 is formed to be able to resolve the state of joining the first part and the second part with smaller force than force of holding the sheet member 32 and the cover 34, thus debonding of the cover 34 from the sheet member 32 can be suppressed when the temporary joint state by the temporary joint part 40 is resolved.

Modification Example

Figure 8:
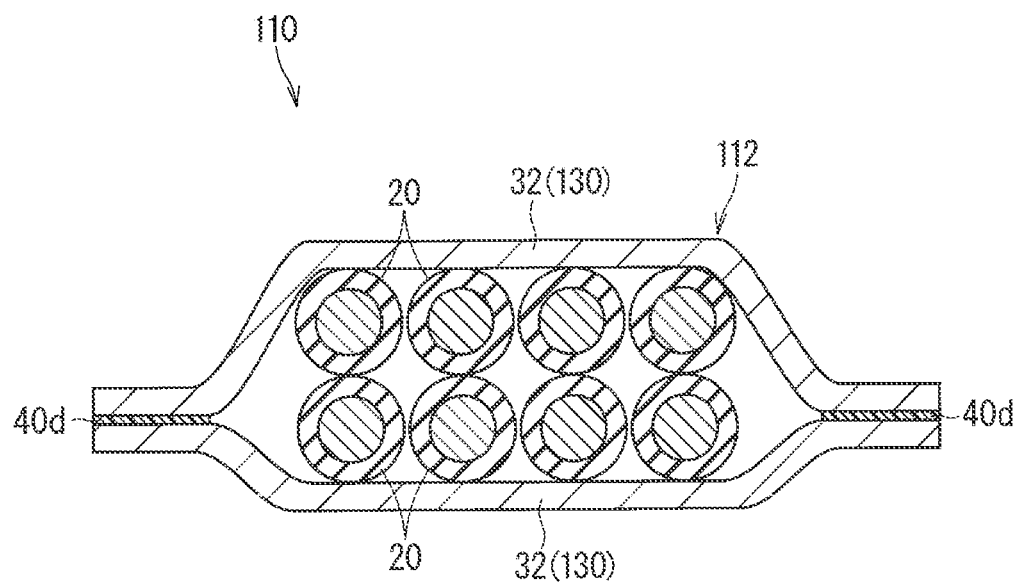
FIG. 8 A schematic cross-sectional plan view illustrating a modification example of the wiring member.

FIG. 8 is a schematic cross-sectional view illustrating a modification example of the wiring member 10.

In the above description, the base member 30 includes the cover 34 in the wiring member 10, however, this configuration is not necessary. There may be a case where the base member 130 does not include the cover 34 as with a wiring member 110 illustrated in FIG. 8. In this case, a temporary joint part 40d joins the sheet members 32 to each other.

In the above description, the temporary joint part 40 joins the part of the base member 30 overlapping with the wire-like transmission member 20, however, this configuration is not necessary. The temporary joint part 40d may join a part which does not overlap with the wire-like transmission member 20 (a lateral portion of the wire-like transmission member 20) as with the example illustrated in FIG. 8.

In the example illustrated in FIG. 8, a wiring body 112 is bended so that the wire-like transmission members 20 face each other. From the other viewpoint, the wiring body 112 is bended so that surfaces of the sheet member 32 to which the wire-like transmission members 20 are fixed, respectively, face each other, however, this configuration is not necessary. The wiring body may be bended so that surfaces of the sheet member 32 to which the wire-like transmission member 20 are fixed, respectively, face each other. The wiring body may be bended so that a surface of the sheet member 32 to which the wire-like transmission member 20 is fixed and a surface thereof to which the wire-like transmission member 20 is not fixed face each other.

Moreover, in the above description, the wire-like transmission member 20 is fixed on the sheet member 32 as the base member 30 in the wiring body 12, however, this configuration is not necessary. For example, a wire-like conductor may be fixed to an inner portion of the base member in the wiring body. Applicable as the wiring body is a so-called flexible flat cable (FFC) formed by sandwiching a plurality of wire-like conductors by two films or extrusion molding a resin material around a plurality of wire-like conductors, for example.

Each configuration described in the embodiment and each modification example can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

Explanation of Reference Signs 10 wiring member
12 wiring body
13 base part
14, 15 bending part
16, 17 easy-bending part
20 wire-like transmission member
30 base member
32 sheet member
34 cover
40 temporary joint part
42 adhesive part
44 intervening object
46 direct fixing part
50 trace
80 arrangement target
100 arrangement structure of wiring member

The invention claimed is:

1. A wiring member, comprising:
a wiring body including a wire-like transmission member and a base member to which the wire-like transmission member is fixed; and
a temporary joint part joining portions where a first part and a second part mutually extending in an opposite side from a bending position in the wiring body overlap with each other in a state where the wiring body is bended in an intermediate portion of the wire-like transmission member in an extension direction to maintain a bending state of the wiring body, and formed to be able to resolve a state of joining the first part and the second part by a relative separation movement of the first part and the second part, wherein
the temporary joint part includes a direct fixing art formed of the base member in the first part and the base member in the second part directly fixed to each other, the wiring member further comprising
a sheet member having a main surface on which the wire-like transmission member is fixed as the base member and a cover for covering the wire-like transmission member from a side opposite to the sheet member, wherein
the cover is fixed to the sheet member and is not fixed to the wire-like transmission member, and
the temporary joint part joins the cover in at least one of the first part and the second part.

2. The wiring member according to claim 1, wherein the temporary joint part includes an adhesive part intervening between the first part and the second part and bonded to the first part and the second part.

3. The wiring member according to claim 1, wherein the temporary joint part is formed to be able to resolve the state of joining the first part and the second part with smaller force than force of holding the sheet member and the wire-like transmission member.

4. The wiring member according to claim 1, wherein the temporary joint part is formed to be able to resolve the state of joining the first part and the second part with smaller force than force of holding the sheet member and the cover.

5. An arrangement structure of a wiring member, comprising:
the wiring member according to claim 1; and
an arrangement target in which the wiring member is disposed in a state where the state of joining the first part and the second part by the temporary joint part is resolved and the first part and the second part are developed.

* * * * *